US012602954B1

(12) United States Patent
Delgoshen et al.

(10) Patent No.: US 12,602,954 B1
(45) Date of Patent: Apr. 14, 2026

(54) METHOD FOR OPERATING AN RFID TRANSPONDER AND PERFORMING VERIFICATION OF OCCUPANTS IN HOV AND HOT APPLICATIONS AND A SYSTEM THEREOF

(71) Applicant: STAR Systems International Limited, Hong Kong (CN)

(72) Inventors: Nitai Delgoshen, Hong Kong (CN); Udi Delgoshen, Hong Kong (CN); Chi Lun Mak, Hong Kong (CN)

(73) Assignee: STAR Systems International Limited, Hong Kong (CN)

( * ) Notice: Subject to any disclaimer, the term of this patent is extended or adjusted under 35 U.S.C. 154(b) by 0 days.

(21) Appl. No.: 19/039,801

(22) Filed: Jan. 29, 2025

(51) Int. Cl.
| | |
|---|---|
| *G07B 15/06* | (2011.01) |
| *G06K 19/07* | (2006.01) |
| *G06V 20/52* | (2022.01) |
| *G06V 40/10* | (2022.01) |

(52) U.S. Cl.
CPC ....... *G07B 15/063* (2013.01); *G06K 19/0723* (2013.01); *G06V 20/52* (2022.01); *G06V 40/10* (2022.01)

(58) Field of Classification Search
CPC ...... G07B 15/063; G06V 20/52; G06V 40/10; G06K 19/0723
See application file for complete search history.

(56) References Cited

U.S. PATENT DOCUMENTS

| | | | | |
|---|---|---|---|---|
| 2011/0226859 A1* | 9/2011 | Chen | ................ | G06K 19/07703 235/492 |
| 2011/0273273 A1* | 11/2011 | Liu | .................... | G06K 19/0724 340/10.1 |
| 2011/0285511 A1* | 11/2011 | Maguire | .............. | H01Q 1/2225 340/10.1 |
| 2014/0375808 A1* | 12/2014 | Kao | ......................... | H04N 7/18 348/148 |
| 2015/0317842 A1* | 11/2015 | Evans | .................. | G06Q 20/325 705/13 |
| 2015/0379782 A1* | 12/2015 | Nakagawa | ........... | G07B 15/063 705/13 |

(Continued)

OTHER PUBLICATIONS

Ahmed, Raihan, et. al., "Automated Toll Management System Using RFID and Image Processing", 2024, Cornell University, arXiv preprint arXiv:2412.01728. (Year: 2024).*

(Continued)

*Primary Examiner* — Shannon S Campbell
*Assistant Examiner* — Wayne S. Murray
(74) *Attorney, Agent, or Firm* — Bayramoglu Law Offices LLC

(57) ABSTRACT

A method to change an identification code of a passive radio frequency identification (RFID) transponder, and to perform verification of occupants in a vehicle, the method comprising: capturing at least one image or at least one video of individual(s); and changing an identification code of the passive RFID transponder to correspond to a number of the individual(s). The method may comprise capturing at least one further image or at least one further video of the same individual(s) after x time; and performing verification of occupants of the vehicle based on the captured at least one image or at least one video, and at least one further image or at least one further video.

19 Claims, 3 Drawing Sheets

(56) References Cited

U.S. PATENT DOCUMENTS

| | | | |
|---|---|---|---|
| 2016/0342883 A1* | 11/2016 | Huhtasalo | H04B 5/77 |
| 2016/0343175 A1* | 11/2016 | Nyalamadugu | G06Q 20/102 |
| 2017/0099286 A1* | 4/2017 | Atherton | G06F 21/32 |
| 2020/0401864 A1* | 12/2020 | Martinez De Velasco Cortina | G06K 19/0723 |

OTHER PUBLICATIONS

U.S. Appl. No. 18/764,443, Star Systems International Limited, Selectable Radio Frequency Identification Transponder, 2024.

\* cited by examiner

METHOD FOR OPERATING AN RFID TRANSPONDER AND PERFORMING VERIFICATION OF OCCUPANTS IN HOV AND HOT APPLICATIONS AND A SYSTEM THEREOF

TECHNICAL FIELD

The present disclosure relates to a passive Radio Frequency Identification (RFID) transponder, especially a multi-frequency selectable/switchable RFID transponder.

BACKGROUND

RFID is a technique used to identify objects by means of electromagnetic waves or radio frequency. An object may be tagged with an electronic code responding label. A common electronic code responding label comprises an antenna and an Integrated Circuit (IC), also known as a chip.

In practice, RFID provides a quick and affordable means to identify objects. Upon receiving a valid interrogating signal from an interrogating source, such as from an interrogating antenna (or "transmitting and receiving antenna") of an RFID reader, the electronic code responding label responds according to its designed protocol. As the electronic code responding label has a unique identification code which relates to the object that the electronic code responding label is attached to, by communicating with the electronic code responding label to retrieve the unique identification code representing the object, one may identify the presence of the object simply by identifying the presence of the electronic code responding label. An electronic code responding label sometimes is known as a label, a tag, or a transponder, etc.

There are mainly two types of RFID transponders, active and passive. An active RFID transponder would have its own battery source, has a greater read range than a passive RFID transponder. However, an active RFID transponder is limited by the lifetime of its battery, and is more expensive and bulkier (with a casing or housing) than a passive RFID transponder. A passive RFID transponder, on the other hand, is a transponder energised by an interrogating signal from an interrogating source (such as an RFID reader). It has a relatively shorter read range but has the advantage of much cheaper price, much smaller form factor (in the form of a thin label), and the convenience of not needing replacement (as there is no battery needed) as compared with an active RFID transponder.

Common operating frequency band of RFID communication includes low frequency (LF) band, high frequency (HF) band, ultra-high frequency (UHF) band, and microwave band. The global UHF RFID frequency band (e.g. Electronic product code (EPC) Class 1 Gen 2/ISO 18000-6C standard) covers 860-960 MHz. For Europe, the ETSI band covers 865-868 MHz. In USA, the FCC band covers 902-928 MHz.

Apart from the conventional logistics and supply chain industries, RFID is an emerging technology in different industries for many applications such as Automatic Vehicle Identification (AVI) systems, congestion control, or Electronic Toll Collection (ETC) systems, traffic management, smart cities, etc. In the field of AVI and ETC, an AVI RFID transponder with a unique ID is attached to a vehicle, in a form of windshield tag, a headlamp tag, a car-plate tag, a rear-view mirror hang tag, vehicle roof tag, or other possible forms. When the tagged vehicle is passing through a designated read zone of an RFID reader, the tagged vehicle is automatically detected and identified, and therefore road toll can be charged accordingly.

AVI RFID transponders are also used in High Occupancy Vehicle lanes (also known as HOV lanes, carpool lanes, diamond lanes, 2+ lanes, transit lanes or T2 or T3 lanes) and High Occupancy Toll lanes (also known as HOT lanes). HOV lanes are restricted traffic lanes reserved for the exclusive use of vehicles with a driver and at least one passenger, including carpools, vanpools, and transit buses. Some HOV lanes require a driver and at least two passengers. These restrictions may be only applied during peak travel times or may be applied at all times. HOT lanes are similar to HOV lanes in that higher occupancy vehicle will attract a better toll rate than a lower occupancy vehicle. AVI RFID transponders, especially selectable or switchable RFID transponders, facilitate the enforcement of HOV lanes and also the toll collection of HOT lanes. Selectable or switchable RFID transponders are a special type of RFID transponders. Theoretically, a selectable or switchable RFID transponder is a set of multiple RFID tags where only one selected tag is active and the rest (non-selected) are inactive. Some practical examples of selectable or switchable RFID transponders may have only one antenna but more than one RFID chip. Typically, only one of the RFID chips (the selected) is active at one time for operation, and the rest (non-selected) of the RFID chips are being inactive or shielded. To achieve this, existing selectable or switchable RFID transponders switch from one chip to the other, by having a pushing, sliding or a rotary mechanism to physically move the intended chip, which is connected to a loop, to interact (by capacitive coupling or direct contact) with the antenna terminals while moving the non-intended chip(s), which is (are) connected to corresponding loop(s), away. Alternatively, the non-intended chip(s), connected with loop(s), may be blocked using metallic shield(s) actuated by a pushing, sliding or a rotary mechanism.

However, it was found that there was a significant number of HOV/HOT violations or incorrect operations of AVI selectable or switchable RFID transponder, especially during peak traffic hours (may be up to 15%-30% HOV/HOT violation across different major cities), due to dishonesty (cheating on purpose) or carelessness (misunderstanding of either the HOV/HOT rules or the operation of the AVI selectable or switchable RFID transponder). For example, a driver may claim that there are several passengers in the same vehicle (by dishonestly selecting to a multiple-occupants setting on a selectable or switchable RFID transponder) so that the said driver can use HOT lanes at a lower rate even when the driver is alone (solo driver). Another temptation for doing the same cheating in HOV lane is that the said driver can use the dedicated HOV lane for faster speed or less travel time even when the driver is alone (solo-driver).

Violation of HOV/HOT lanes can have several negative consequences for the community including but not limited to i) impacting traffic flow: carpooling is not promoted effectively and the desired average speed of the HOV/HOT lane will be decreased to an inefficient level (HOV/HOT lane is typically intended to provide a travel speed of around 50-65 mph), ii) significant loss of revenue: this loss can impact funding for infrastructure, road maintenance/improvement or public transportation services, iii) unfair to those who are obeying the HOV/HOT rules: for those who use HOV lanes by carpooling, this promotes a fair reward system where those making an effort to reduce congestion are recognized and given priority over those who do not. Similarly, HOT lane users who pay the toll are entitled to faster travel, and this entitlement should not be diluted by rule-breakers or cheaters.

People cheat in using HOV/HOT lanes primarily because it allows them to bypass heavy traffic by driving in a dedicated lane meant for vehicles with multiple occupants, essentially saving them significant amount of time especially during peak traffic hours, even if they are driving alone (solo driver), often calculating that the risk of getting caught is low compared to the potential time saved.

Other reasons for cheating or improper use of HOV/HOT lanes are i) perception of low enforcement: some drivers might underestimate the likelihood of being caught by law enforcement, leading to a "calculated risk" mentality; ii) easy to fake compliance: some creative drivers may use whatever method to cheat and appear like they meet the occupancy requirements, such as placing a fake mannequin in the passenger seat or using a baseball cap on top of clothes in a briefcase, etc. iii) lack of awareness: some drivers might not fully understand the HOV/HOT lanes rules or believe they are exempt due to a misunderstanding.

The present disclosure provides an alternative method for operating a selectable or switchable passive RFID transponder in HOV and HOT applications and a system thereof, and to reliably verify if the use of HOV/HOT lanes complies to its rule legitimately in order to reduce or eliminate HOV/HOT violations.

Reducing or eliminating HOV/HOT lane violations has several important benefits, both for the individual driver and the broader community. Some key benefits include but are not limited to i) encouraging carpooling, ii) improving traffic flow and maximize lane efficiency, iii) avoiding fines and penalties, iv) ensuring correct toll revenue can be received, v) promoting fairness to honest HOV/HOT users.

SUMMARY

According to a first aspect of the present disclosure, there is provided a method to change an identification code of a radio frequency identification (RFID) transponder, the method comprising: capturing at least one image or at least one video of individual(s); and changing an identification code of the RFID transponder to correspond to a number of the individual(s).

In one form, the RFID transponder is a passive switchable, selectable or changeable transponder attached to a vehicle.

In one form, the method further comprises: x time after the step of capturing at least one image or at least one video of individual(s), capturing at least one further image or at least one further video of the individual(s); and verifying the changed identification code with the captured at least one further image or at least one further video of the individual(s). In one form, the x time is predetermined, random, or triggered by at least one event. In one form, the step of verifying the changed identification code comprises one or both of the following: determining if the number of the individual(s) before and after x time are the same; and determining if each of the individual(s) is the same person before and after the x time.

In one form, the step of changing the identification code of the RFID transponder is based on at least one image processing technique of the captured at least one image or at least one video to determine the number of the individual(s) in the captured at least one image or at least one video.

In one form, the step of changing the identification code of the RFID transponder is performed manually by one of the individual(s) in a vehicle; and the step of capturing at least one image or at least one video of individual(s) in the vehicle is to verify that the step of changing the identification code of the RFID transponder is performed correctly; and wherein the at least one image or at least one video is (are) deleted thereafter.

In one form, the RFID transponder is a multi-frequency RFID transponder which comprises: a multi-frequency chip containing the identification code; a first antenna, operated at a first frequency band, connected to the multi-frequency chip; and a second antenna, operated at a second frequency band different from the first frequency band, connected to the multi-frequency chip; wherein the first antenna, the second antenna and the multi-frequency chip are configured and arranged such that the RFID transponder is readable by an RFID reader at the first frequency band to obtain the identification code; and the RFID transponder is controllable by a terminal different from the RFID reader at the second frequency band to change the identification code. In one form, the at least one image or at least one video is captured by the terminal that controls the RFID transponder to change the identification code. In one form, the at least one image or at least one video is captured by a different terminal different from the RFID reader and different from the terminal that controls the RFID transponder to change the identification code.

In one form, the at least one image or at least one video of the individual(s) is captured by a handheld device with at least one camera.

In one form, the step of verifying the changed identification code with the captured further image or further video is performed locally by a handheld device with at least one camera; and wherein the handheld device stores a pass-fail verification confirmation locally or sends a pass-fail verification confirmation to a server after the step of verifying is completed. In one form, the at least one image or the at least one video and the at least one further image or the at least one further video is (are) deleted after the step of verifying is completed.

In one form, the identification code is a unique code made up of EPC memory, or user memory of the multi-frequency chip, or both.

In one form, the first frequency band is a UHF band and the second frequency band is an HF band.

In one form, the first antenna is a UHF dipole-type antenna and the second antenna is an HF or NFC coil.

In one form, the identification code of the RFID transponder is changed according to the number of individual(s) in a vehicle for entering High Occupancy Vehicle (HOV) or High Occupancy Toll (HOT) express lanes.

In one form, passing the step of verifying cumulates points for an account associated to a vehicle for fulfilling at least one riding condition. In one form, the riding condition comprises the usage of High Occupancy Vehicle (HOV) or High Occupancy Toll (HOT) express lanes.

According to a second aspect of the present disclosure, there is provided a system for High Occupancy Vehicle (HOV) or High Occupancy Toll (HOT) applications, the system comprising: a radio frequency identification (RFID) transponder attached to a vehicle; a mobile terminal configured to: change an identification code of the radio frequency identification (RFID) transponder to correspond to a number of individual(s) in the vehicle; capture at least one image or at least one video of the individual(s) in the vehicle before x time; capture at least one further image or at least one further video of the individual(s) in the vehicle after x time;

and verify the changed identification code with the captured image or video, and the captured further image or further video.

BRIEF DESCRIPTION OF THE DRAWINGS

Embodiments of the present disclosure will be discussed with reference to the accompanying drawings wherein.

DETAILED DESCRIPTION OF THE EMBODIMENTS

Figure 1:
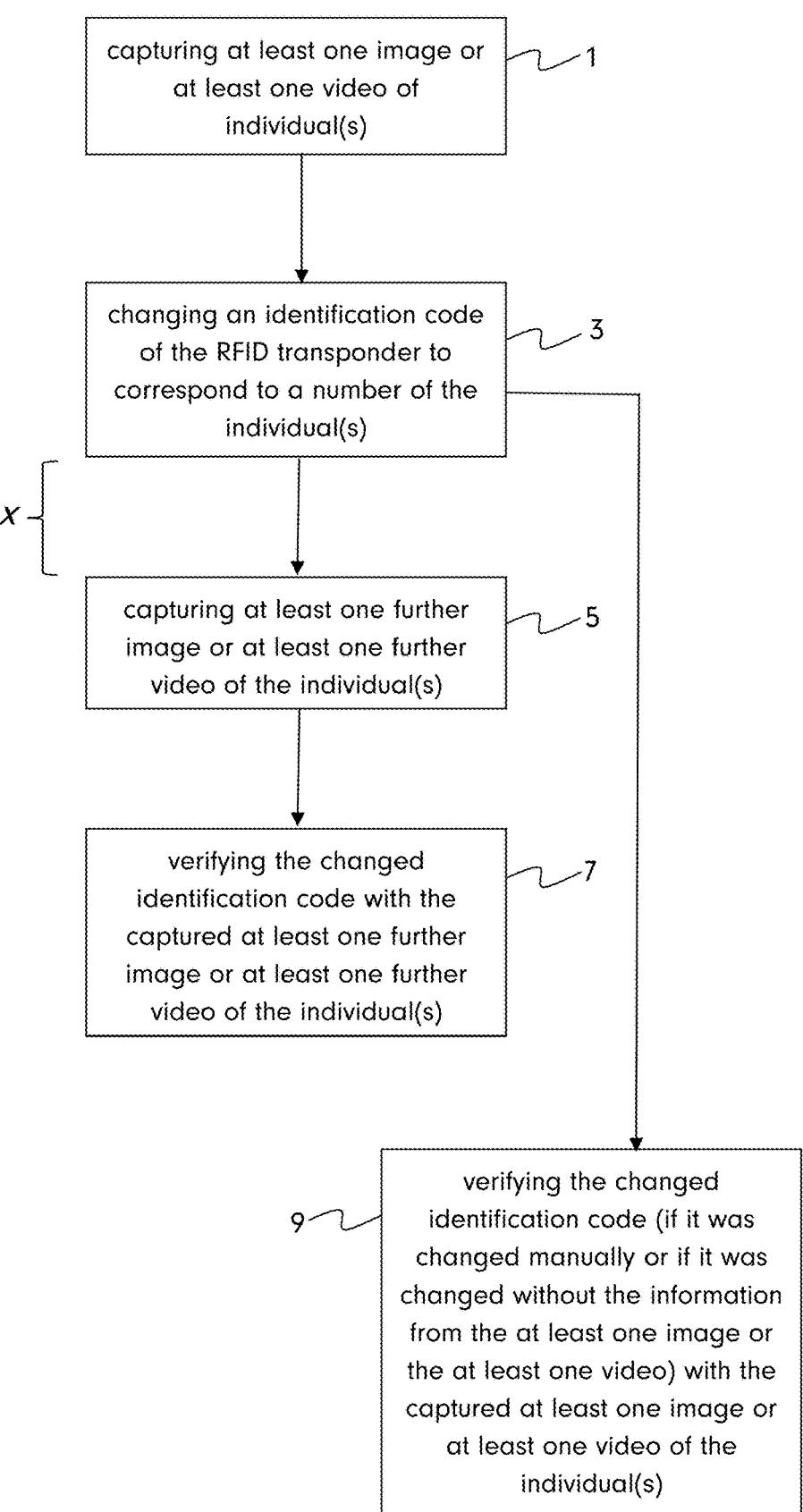
FIG. 1 depicts a general form of the present disclosure.

FIG. 1 depicts a general form of the present disclosure for operating an RFID transponder and performing verification of occupants in a vehicle in HOV and HOT applications. In this general form, there is a method to change an identification code of a selectable or switchable radio frequency identification (RFID) transponder while ensuring the change is valid and correctly representing the number of individual(s) in the vehicle. The method comprising firstly the step of capturing at least one image or at least one video of individual(s) 1. The image may be in any format deemed suitable by a person skilled in the art, depending on the device used to capture the image of the individual(s). For example, the format may be JPG, JPEG, PNG, GIF, TIFF, BMP, PSD, SVG, EPS, RAW, HEIF/HEIC, WEBP, ICO, PDF or other compatible formats, etc. The video may be in any format deemed suitable by a person skilled in the art, depending on the device used to capture the video of the individual(s). For example, the format may be MP4, MOV, AVI, MKV, WMV, FLV, WebM, 3GP, MPEG-2, MPEG-4, HEVC, OGG, QuickTime, ProRes, Divx, Xvid, or other compatible formats, etc. The term "capturing" means to take a photograph or video in real time, without selecting from existing media (saved images or video) in an album or memory card(s). The term "individual(s)" means generally human being(s). Depending on applications, the term "individual(s)" may also refer to human being(s) of a certain age range.

This is followed by the step of changing an identification code of the selectable or switchable RFID transponder to correspond to a number of the individual(s) 3.

As explained in the background section, there are many types of RFID transponders. The method of the present disclosure works as long as the identification code of an RFID transponder is changeable. For example, the RFID transponder may be a passive switchable, selectable or changeable transponder attached to a vehicle. The identification code may take many forms as long as there is a way to correspond a code to a number of the individual(s). Examples of identification code will be further discussed in later part in relation to RFID transponders.

In one embodiment, the step of changing the identification code of the selectable or switchable RFID transponder to correspond to a number of the individual(s) 3 is based on at least one image processing technique of the captured at least one image or at least one video to determine the number of the individual(s) in the captured at least one image or at least one video. In other words, the change of the identification code of the selectable or switchable RFID transponder is not performed manually.

In another embodiment, the step of changing the identification code of the selectable or switchable RFID transponder to correspond to a number of the individual(s) 3 is performed manually by one of the individual(s) in the vehicle. For example, when there are a driver and two passengers in a vehicle, one of them changes the identification code of the RFID transponder manually (either to tap on a screen or physically switch a selectable or switchable RFID transponder) to indicate that there are three individuals in the vehicle. To ensure that there is no dishonesty or mistakes, this embodiment also requires the step of capturing the at least one image or at least one video of all individual(s) 1 in the vehicle to verify that the step of changing the identification code of the selectable or switchable RFID transponder manually is performed correctly 9.

Optionally, as shown also in FIG. 1, the step of changing an identification code of the selectable or switchable RFID transponder to correspond to a number of the individual(s) 3 is followed by the step of capturing at least one further image or at least one further video of the individual(s) 5 after time x, and the step of verifying the changed identification code with the captured at least one further image or at least one further video of the individual(s) 7.

The step of capturing at least one image or at least one video of individual(s) 1, and the step of capturing at least one further image or at least one further video of the individual(s) 5 may be performed by the same device or different devices. For example, the step of capturing at least one image or at least one video of individual(s) 1 may be performed by a first mobile smart phone, while the step of capturing at least one further image or at least one further video of the individual(s) 5 may be performed by a different second mobile smart phone. Alternatively, as another example, both steps may be performed by a single mobile smart phone. Other devices with photo or video taking capabilities may also be used, such as a tablet, PDA, smart handheld devices, smart pocket camcorder, smart body camera, 360-degree camera, dual dash camera, etc. Alternatively, instead of a mobile smart device, the step(s) may be performed by a video camera equipped in the vehicle, such as built-in cabin camera, dash camera, rearview camera, etc.

In one embodiment, the x time is predetermined, it can be in the order of (but not limited to) seconds, minutes, hours, days and so on. The x time may also be random. Alternatively, the end of x time may be triggered by at least one event. For example, when a vehicle is exiting a lane, or passing through a checkpoint, or when the vehicle comes to completely stop, etc.

In another embodiment, the verification of step indicated by 7 takes place continuously. In other words, there are repeating x time cycles, where x will be a very short time interval. For every cycle at least one further image or at least one further video is captured for continuous verification.

The step of verifying the changed identification code with the captured at least one further image or at least one further video of the individual(s) 7 may take different forms. For example, for the verification purposes, the step of verifying the changed identification code with the captured at least one further image or at least one further video of the individual(s) 7 may comprise determining if the number of the individual(s) before and after x time are the same. Alternatively, the step of verifying the changed identification code with the captured at least one further image or at least one further video of the individual(s) 7 may comprise determining if each of the individual(s) is the same person before and after the x time. As another alternative, both the steps of determining if the number of the individual(s)

before and after x time are the same; and determining if each of the individual(s) is the same person before and after the x time are performed.

In one embodiment, the accuracy of the verification 7 may be improved by capturing more biometric information from each individual. Biometric information includes voice, fingerprints, iris, palm or finger vein patterns, and other unique biometric information, etc.

In one embodiment, all collected data will be deleted after completion of verifications 7 (and 9) and confirmation or after a predetermined amount of time. In another embodiment, all collected data is stored locally or stored remotely in a server.

Figure 2:
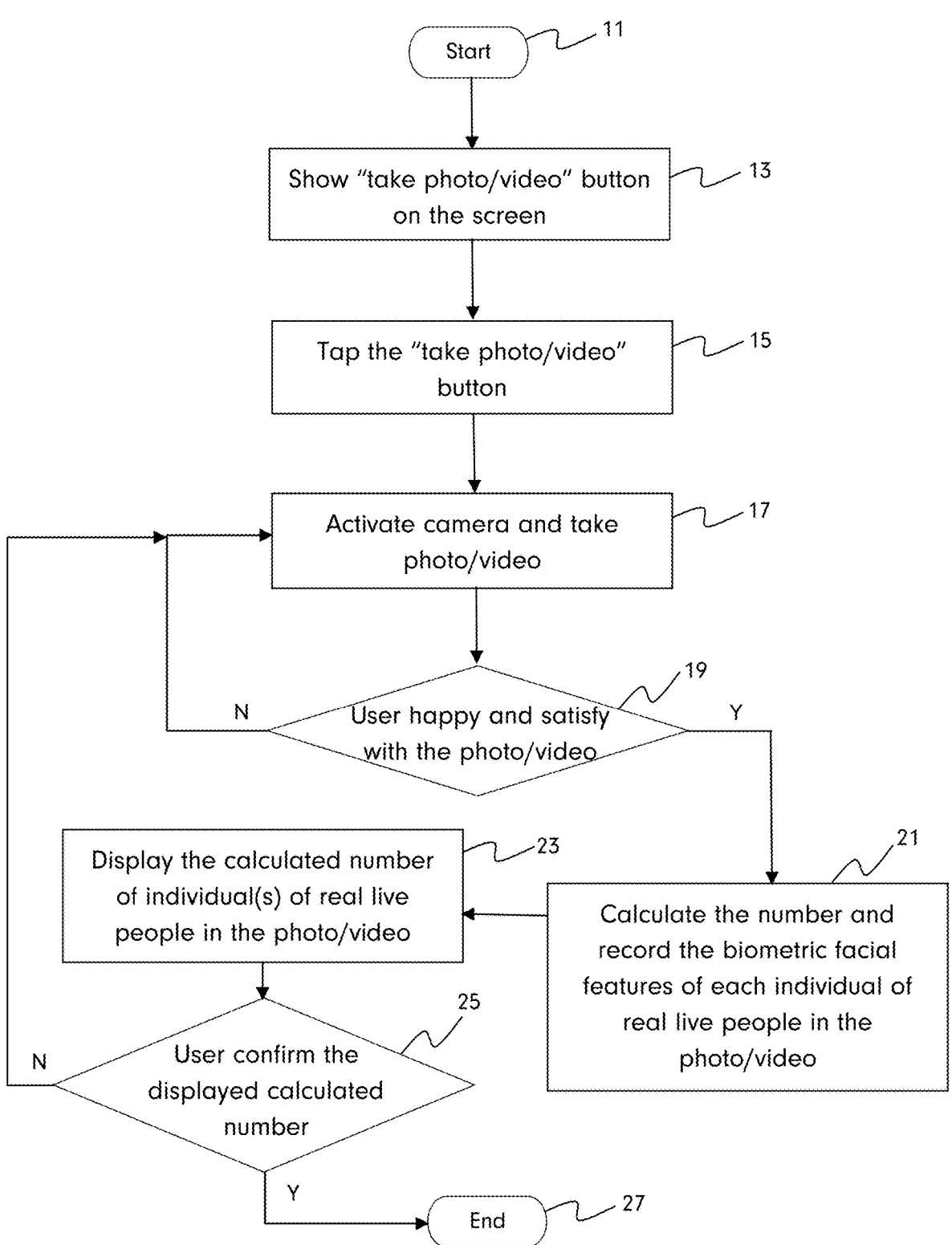
FIG. 2 depicts an exemplary flow chart of a method for operating an RFID transponder and performing verification of occupants.

FIG. 2 depicts an exemplary flow chart of a method for operating a selectable or switchable RFID transponder and performing verification of occupants in a vehicle. In this embodiment, a smartphone/mobile application (mobile APP) on a mobile device is used as an example. Of course, mobile devices may take many forms or may be other forms as discussed previously. When a user wishes to capture at least one image or at least one video of individual(s), the mobile APP on the mobile device is initiated 11. On the screen of the mobile device, a "take photo" button or a "take video" button is shown 13. The user then taps to select "take photo" or "take video" 15. The mobile device activates its camera to take a photo or a video 17. The taken photo or video is presented to the user. If the user is happy and satisfied with the photo or video 19, then the mobile APP calculates the number of individual(s) and record the biometric facial features of each individual of real live people in the photo or video 21, displays the calculated number 23, user confirms the displayed calculated number 25, and the process ends 27. In one form, the mobile APP is equipped with algorithms to analyse and calculate the number of real live people in the photo or video. This is to prevent one from circumventing the system using printed photos to represent real live individual(s).

Of course, if the user is unhappy or not satisfied with the photo or video 19, the mobile APP activates the camera again to take a photo or a video 17. Also, if the user does not agree with the displayed calculated number 25, the mobile APP activates the camera again to take a photo or video 17.

Further, the sequence of the method shown in FIG. 1 may be rearranged as long as it makes sense and is convenient to the users, as long as there are the steps of capturing at least one image or at least one video of individual(s) and changing an identification code of the selectable or switchable RFID transponder to correspond to a number of the individual(s). For example, it is possible to change the identification code of the selectable or switchable RFID transponder first (e.g. manually) before capturing at least one image or at least one video, instead of capturing at least one image or at least one video then changing the identification code of the selectable or switchable RFID transponder (e.g. manually or non-manually).

Figure 3:
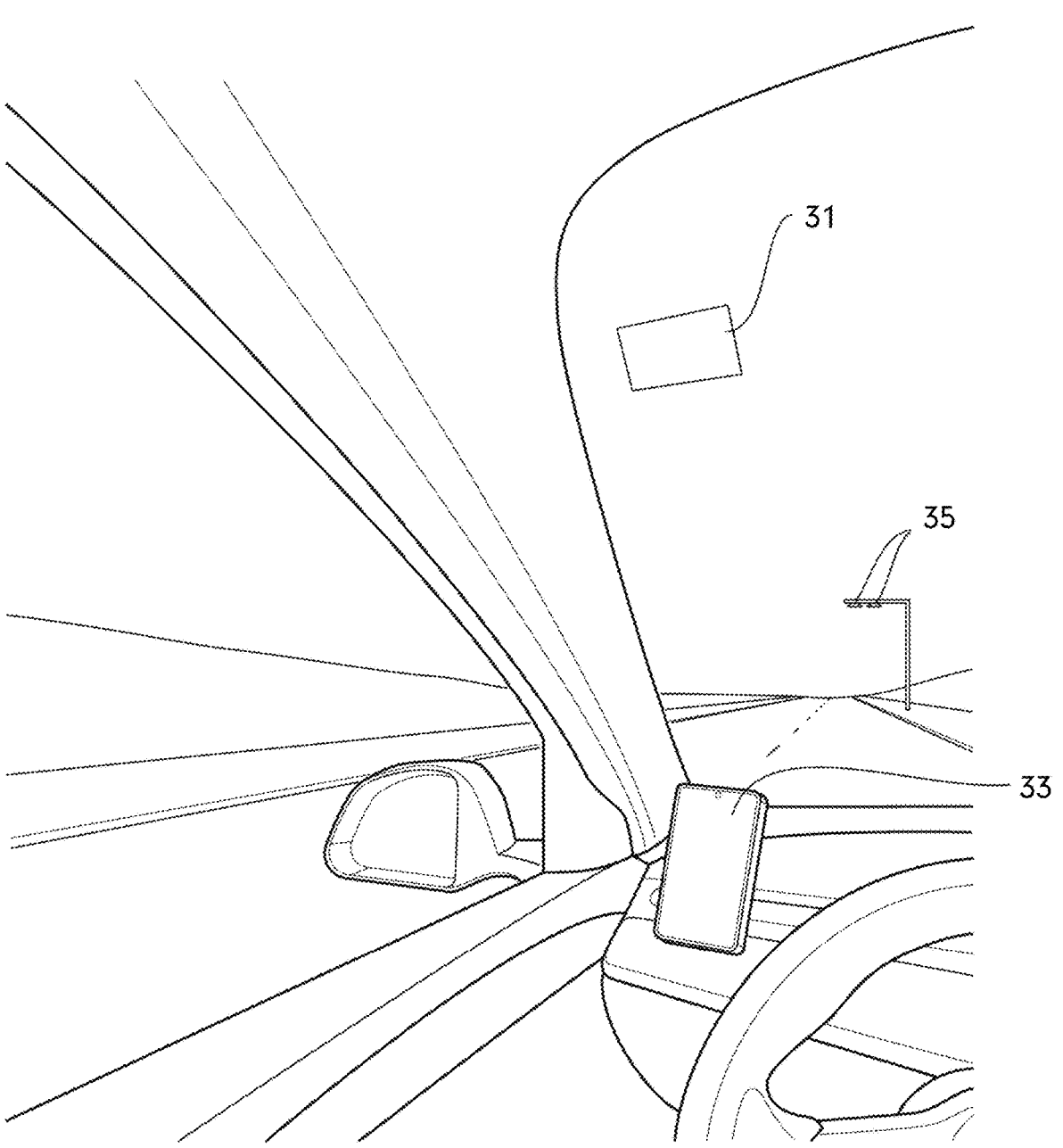
FIG. 3 depicts an exemplary operation of a multi-frequency selectable or switchable RFID transponder.

FIG. 3 depicts an exemplary operation of a multi-frequency selectable or switchable RFID transponder according to the present disclosure. An example of a multi-frequency selectable RFID transponder suitable for the present disclosure is presented in U.S. patent application Ser. No. 18/764,443.

In one embodiment, the multi-frequency selectable or switchable RFID transponder comprises two antennas, an HF antenna (or coil), and a UHF antenna. A single RFID chip operating in both HF and UHF is connected to the HF antenna (or coil) and the UHF antenna. The HF antenna (or coil) may be a multiple-loop antenna (or coil). There are many other possible designs for the HF antenna (or coil) as long as the HF antenna (or coil) enables the RFID chip to operate in the HF band. The UHF antenna may be a dipole-type antenna with a loop in the middle of the two dipole arms (or meandering arms). There are many other possible designs for the UHF antenna as long as the UHF antenna enables the RFID chip to operate in the UHF band. The HF antenna (or coil) enables the RFID chip connected to the HF antenna (or coil) to operate in the HF band. Similarly, the UHF antenna enables the RFID connected to the UHF antenna to operate in the UHF band.

This multi-frequency selectable or switchable RFID transponder comprises a multi-frequency chip containing an identification code, a first antenna, operated at a first frequency band, connected to the multi-frequency chip, and also a second antenna, operated at a second frequency band different from the first frequency band, connected to the multi-frequency chip. The first antenna, the second antenna and the multi-frequency chip are configured and arranged such that the multi-frequency selectable or switchable RFID transponder is readable by an RFID reader at the first frequency band to obtain the identification code; and the multi-frequency selectable or switchable RFID transponder is controllable by a terminal different from the RFID reader at the second frequency band to change the identification code.

The term "multi-frequency" means that the RFID transponder operates in at least two distinctive frequency bands. Common RFID frequency bands include LF band at 125-135 kHz, HF band at 13.56 MHz, UHF band at 860-960 MHz, and Microwave at 2.45 GHz. Of course, other frequency bands are possible. Similarly, a "multi-frequency" chip refers to an RFID chip that works in at least two frequency bands. The multi-frequency chip may be a single chip with a pair of antenna terminals, a single chip with two or more sets of antenna terminals, or it may take a form of two or more separate modules (one for each band) sharing a same memory containing the identification code of the RFID transponder. Some examples of memory may be random access memory (RAM), static random access memory (SRAM), read only memory (ROM), or programmable read only memory (PROM), erasable programmable read only memory (EPROM), electrically erasable programmable read only memory (EEPROM), etc.

The "identification code" may take the form of an Electronic Product Code (EPC), which is a universal identifier that gives a unique identity to a specific physical object. This identity is designed to be unique among all physical objects and all categories of physical objects in the world, for all time. Alternatively, the identification code may take the form of proprietary code or accordingly to other standards, as long as the identification code may provide an identification. In the case of an existing multi-frequency selectable or switchable RFID transponder for HOV/HOT lanes, an identification code is used to indicate that the car is with one occupancy (single driver or solo driver); a second identification code different from the first is used to indicate that the car is with two occupancies (one driver and one passenger); and a third identification code different from the first and second is used to indicate that the car is with more than two occupancies (one driver and two or more passengers). With the detection of the identification code in HOT application, corresponding toll payment would then be deducted from a corresponding account on the back-end system. The identification code of the multi-frequency selectable or switchable RFID transponder of the present disclosure functions the same way or similarly.

With the configuration and arrangement of the first antenna, the second antenna and the multi-frequency chip of the present disclosure, the multi-frequency selectable or switchable RFID transponder of the present disclosure is readable by an RFID reader at the first frequency band to obtain the identification code; and the multi-frequency selectable or switchable RFID transponder is controllable by a terminal different from the RFID reader at the second frequency band (different from the first frequency band) to change the identification code.

The terminal different from the RFID reader may be a hand-held smart device, mobile phone device, laptop computer, smart camera, smart phones, tablets, wearables or any device that has an ability to communicate with the multi-frequency selectable or switchable RFID transponder wirelessly. For example, the terminal may be a device with NFC capabilities, Bluetooth or Bluetooth Low Energy (BLE), Ultra-Wideband (UWB), Zigbee, Wi-Fi, Infra-red, Near-Link, etc.

As shown in FIG. 3, a multi-frequency selectable or switchable RFID transponder 31 is attached (usually interior) on the windshield of a vehicle. A terminal in the form of a mobile phone 33 is used to change the identification code of the multi-frequency selectable or switchable RFID transponder 31 when the vehicle is not in motion. For example, initially the identification code is a code used to represent a single occupant (single driver only). When the number of occupants of the car changes to be more than two people (driver and more than one passenger), then the mobile phone 33 is used to establish a link (an HF/NFC link) with the multi-frequency selectable or switchable RFID transponder 31 to change the identification code to a code used to represent more than two occupants (3+ mode). A HOT lane (or HOV lane) is with RFID reader antenna installed, for example reader antennas 35 installed on an overhead support. When the car enters the HOT lane (or HOV lane) and driven pass the read zone of reader antennas 35, the reader antennas 35 establish a link (a UHF RFID link) with the multi-frequency selectable or switchable RFID transponder 31 and reads the identification code representing more than two occupants (3+ mode). Appropriate toll fee is then deducted from the corresponding account on the back-end.

In this embodiment, the mobile phone 33 uses HF band to change the identification code of the multi-frequency selectable or switchable RFID transponder 31 (when the mobile phone 33 is in close proximity (few cm) with the multi-frequency selectable or switchable RFID transponder 31) while the RFID reader antennas 35 uses UHF band to read the identification code of the multi-frequency selectable or switchable RFID transponder 31. The read range of HF band is typically very short from few cm to less than 10 cm. The read range of UHF band is typically longer in the range of 30 cm to 10 m or more or so. According to the AVI standard from 6C Coalition, the read range requirement of an RFID transponder applied on a windshield is 7-12 m.

The mobile phone 33 may change the identification code of the multi-frequency selectable or switchable RFID transponder 31 through a mobile APP or a proprietary software. The mobile APP or proprietary software may communicate with a server to authenticate a code prior to changing the identification code of the multi-frequency selectable or switchable RFID transponder 31. In one form, the mobile APP or proprietary software may first obtain a list of approved codes from a server. Then a user can select one of the approved codes from the list presented by the mobile APP or a proprietary software so that the mobile APP or a proprietary software will carry out the operation to read the multi-frequency selectable or switchable RFID transponder 31 and change its identification code to the one selected from the list. While changing the identification code, internet access from the mobile phone 33 is not necessary.

A user may use mobile phone 33 to activate a standard mode or verification mode or other modes in the mobile APP.

As an example, the user may choose an appropriate HOV/T-mode (e.g. Solo/2/3+) for toll collection at the beginning by changing the identification code of the multi-frequency selectable or switchable RFID transponder 31 to correspond to the number of the individual(s) in the vehicle.

Under the standard mode, a user can take at least one image/video (before-ride photo/video) using a handheld terminal, which includes all riders, at the beginning (preferably when the vehicle is not in motion for safety reasons) before using HOV/T lane(s). The before-ride photo/video is stored locally in the handheld terminal or in a server. Storing locally has the benefit of improving privacy and time latency issues. A mobile APP can change the identification code of multi-frequency selectable RFID transponder 31 (corresponding to HOV/T mode) based on the before-ride photo/video. After using the HOV/T lane(s), no further action is required.

Under the standard mode, the user may maintain their current selected HOV/T mode for future rides in HOV/T lane as long as the number of passengers remains unchanged. In other words, the standard mode provides convenience when the number of car-poolers does not change. Users are not required to use a mobile terminal to change or re-select the HOV/T mode (either manually or non-manually) if the number of car-poolers stays the same. This is especially beneficial for frequent riders and passengers who regularly share (carpooling) the same vehicle. No change or re-selection is required if the vehicle will not be using the HOV/T lane, even if the number of car-poolers has changed (e.g. from multiple passengers to a single driver).

However, in one embodiment, as there is no further action taken (for example, step indicated by 5 in FIG. 1 is not taken) and no verification of occupants (for example, step indicated by 7 in FIG. 1 is not performed) after using the HOV/T lane, users cannot earn additional rewards (or other benefits) while enjoying this convenience under the standard mode.

On the other hand, under the verification mode, additional rewards or other incentives may be provided by toll operators, government or authority to encourage such a use.

To perform the verification mode, a user is required to take at least one image/video (before-ride photo/video) using a handheld terminal, which includes all riders, at the beginning (preferably when the vehicle is not in motion for safety reasons) every time before using HOV/T lane(s). The before-ride photo/video is stored locally in the handheld terminal or in a server. Storing locally has the benefit of improving privacy and time latency issues. After using the HOV/T lane(s), users are required to take at least one further image/video (after-ride photo/video) using the handheld terminal (step indicated by 5 in FIG. 1), which include all the same riders. This after-ride photo/video is stored locally in the handheld terminal or in a sever. Storing locally has the benefit of improving privacy and time latency issues. By doing so, the software or system may compare the before-ride and after-ride photos/videos and verify if it was a legitimate carpooling.

As this verification mode causes some efforts (taking photos/videos before and after using a HOV/T lane) from the users every time when they use a HOV/T lane even if the number of individual(s) in a vehicle remains with no change, additional incentives or rewards may be given to users if they choose the verification mode. Such a method and system also benefiting the toll operator, as the verification mode may effectively verify a legitimate carpool in a quick and accurate manner, and which can significantly reduce the number of cheatings, misuses and violations. Toll revenue may be significantly increased as losses due to misuse are reduced significantly. Therefore, the verification mode is beneficial to both toll operators and users.

While the example shown in FIG. 3 is in relation to a car, the same application can be applied to any vehicle, such as a sedan, a minivan, a van, an SUV, a truck, a bus, a wagon, a motorbike, a tram, a boat, a submarine, a ship, a ship compartment, an aircraft, a helicopter, an elevator, a train, a train compartment, unmanned or driverless vehicle, drone, spacecraft, emergency vehicle, service vehicle, auto-piloted vehicle, electric vehicle, hot-air balloon, flying car, flying boat, amphibious vehicle, amphibious-flying vehicle, flying submarine, etc.

While it is envisaged that the multi-frequency selectable or switchable RFID transponder 31 is a passive RFID transponder, the multi-frequency selectable or switchable RFID transponder 31 can also take the form of an active RFID transponder and semi-active or semi-passive transponder.

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claim.

What is claimed is:

1. A method to change an identification code of a radio frequency identification (RFID) transponder, the method comprising:

capturing at least one image or at least one video of individual(s); and changing an identification code of the RFID transponder to correspond to a number of the individual(s);

wherein the RFID transponder is a multi-frequency RFID transponder which comprises:

a multi-frequency chip containing the identification code;

a first antenna, operated at a first frequency band, connected to the multi-frequency chip; and a second antenna, operated at a second frequency band different from the first frequency band, connected to the multi-frequency chip;

wherein the first antenna, the second antenna and the multi-frequency chip are configured and arranged such that the RFID transponder is readable by an RFID reader at the first frequency band to obtain the identification code; and the RFID transponder is controllable by a terminal different from the RFID reader at the second frequency band to change the identification code.

2. The method of claim 1, wherein the RFID transponder is a passive switchable, selectable or changeable transponder attached to a vehicle.

3. The method of claim 1, further comprises:

x time after the step of capturing at least one image or at least one video of individual(s), capturing at least one further image or at least one further video of the individual(s); and verifying the changed identification code with the captured at least one further image or at least one further video of the individual(s).

4. The method of claim 3, wherein the x time is predetermined, random, or triggered by at least one event.

5. The method of claim 3, wherein the step of verifying the changed identification code comprises one or both of the following:

determining if the number of the individual(s) before and after x time are the same; and determining if each of the individual(s) is the same person before and after the x time.

6. The method of claim 1, wherein the step of changing the identification code of the RFID transponder is based on at least one image processing technique of the captured at least one image or at least one video to determine the number of the individual(s) in the captured at least one image or at least one video.

7. The method of claim 1, wherein the step of changing the identification code of the RFID transponder is performed manually by one of the individual(s) in a vehicle; and the step of capturing at least one image or at least one video of individual(s) in the vehicle is to verify that the step of changing the identification code of the RFID transponder is performed correctly; and wherein the at least one image or at least one video is (are) deleted thereafter.

8. The method of claim 1, wherein the at least one image or at least one video is captured by the terminal that controls the RFID transponder to change the identification code.

9. The method of claim 1, wherein the at least one image or at least one video is captured by a different terminal different from the RFID reader and different from the terminal that controls the RFID transponder to change the identification code.

10. The method of claim 1, wherein the at least one image or at least one video of the individual(s) is captured by a handheld device with at least one camera.

11. The method of claim 3, wherein the step of verifying the changed identification code with the captured further image or further video is performed locally by a handheld device with at least one camera; and wherein the handheld device stores a pass-fail verification confirmation locally or sends a pass-fail verification confirmation to a server after the step of verifying is completed.

12. The method in claim 11, wherein the at least one image or the at least one video and the at least one further image or the at least one further video is (are) deleted after the step of verifying is completed.

13. The method of claim 1, wherein the identification code is a unique code made up of EPC memory, or user memory of the multi-frequency chip, or both.

14. The method of claim 1, wherein the first frequency band is a UHF band and the second frequency band is an HF band.

15. The method of claim 1, wherein the first antenna is a UHF dipole-type antenna and the second antenna is an HF or NFC coil.

16. The method of claim 1, wherein the identification code of the RFID transponder is changed according to the number of individual(s) in a vehicle for entering High Occupancy Vehicle (HOV) or High Occupancy Toll (HOT) express lanes.

17. The method of claim 11, wherein passing the step of verifying cumulates points for an account associated to a vehicle for fulfilling at least one riding condition.

18. The method of claim 17, wherein the riding condition comprises the usage of High Occupancy Vehicle (HOV) or High Occupancy Toll (HOT) express lanes.

19. A system for High Occupancy Vehicle (HOV) or High Occupancy Toll (HOT) applications, comprising:

a radio frequency identification (RFID) transponder attached to a vehicle;

a mobile terminal configured to:

change an identification code of the radio frequency identification (RFID) transponder to correspond to a number of individual(s) in the vehicle; and capture at least one image or at least one video of the individual(s) in the vehicle before x time; capture at least one further image or at least one further video of the individual(s) in the vehicle after x time; and verify the changed identification code with the captured image or video, and the captured further image or further video;

wherein the RFID transponder is a multi-frequency RFID transponder which comprises:

a multi-frequency chip containing the identification code;

a first antenna, operated at a first frequency band, connected to the multi-frequency chip; and a second antenna, operated at a second frequency band different from the first frequency band, connected to the multi-frequency chip;

wherein the first antenna, the second antenna and the multi-frequency chip are configured and arranged such that the RFID transponder is readable by an RFID reader at the first frequency band to obtain the identification code; and the RFID transponder is controllable by a terminal different from the RFID reader at the second frequency band to change the identification code.

* * * * *